(12) United States Patent
Lee et al.

(10) Patent No.: US 9,793,572 B2
(45) Date of Patent: Oct. 17, 2017

(54) RECHARGEABLE BATTERY

(71) Applicant: SAMSUNG SDI CO., LTD., Yongin-si, Gyeonggi-do (KR)

(72) Inventors: Jin-Hyon Lee, Yongin-si (KR);
Ji-Woon Lee, Yongin-si (KR);
Eun-Young Goh, Yongin-si (KR);
Sang-In Park, Yongin-si (KR);
Sung-Yong Kim, Yongin-si (KR);
Jin-Seon Shin, Yongin-si (KR);
Jong-Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/838,299

(22) Filed: Aug. 27, 2015

(65) Prior Publication Data

US 2016/0104914 A1    Apr. 14, 2016

(30) Foreign Application Priority Data

Oct. 8, 2014 (KR) .................. 10-2014-0136201

(51) Int. Cl.
*H01M 2/00* (2006.01)
*H01M 10/04* (2006.01)
(Continued)

(52) U.S. Cl.
CPC ....... *H01M 10/0431* (2013.01); *H01M 2/022* (2013.01); *H01M 2/046* (2013.01);
(Continued)

(58) Field of Classification Search
CPC ..................................................... H01M 2/00
See application file for complete search history.

(56) References Cited

U.S. PATENT DOCUMENTS 5,849,431 A * 12/1998 Kita .................... H01M 2/0202
429/164
6,841,297 B2    1/2005 Kitoh et al.
(Continued)

FOREIGN PATENT DOCUMENTS

JP    08-329972 A    12/1996
KR    10-0417560 B1    4/2004

OTHER PUBLICATIONS

English machine translation of Japanese Publication No. JP 08-329972 A, dated Dec. 13, 1996, 11 pages.
(Continued)

*Primary Examiner* — Jacob Marks
(74) *Attorney, Agent, or Firm* — Lewis Roca Rothgerber Christie LLP

(57) ABSTRACT

A rechargeable battery includes an electrode assembly having first and second electrodes at opposite sides of a separator and wound about an axis; a first terminal coupled to the first electrode through a first tab; a second terminal coupled to the second electrode through a second tab; a case accommodating the electrode assembly and including first and second openings at its opposite ends; a first gasket between the first terminal and the first opening, the first gasket sealing the first opening and allowing the first terminal to protrude outside of the case; and a second gasket between the second terminal and the second opening, the second gasket sealing the second opening and allowing the second terminal to protrude outside of the case. The case may further include a fixing portion at its inner side that protrudes toward the electrode assembly.

12 Claims, 5 Drawing Sheets

(51) Int. Cl.
  *H01M 2/02*    (2006.01)
  *H01M 2/04*    (2006.01)
  *H01M 2/22*    (2006.01)
  *H01M 2/30*    (2006.01)

(52) U.S. Cl.
  CPC ............... *H01M 2/22* (2013.01); *H01M 2/30* (2013.01); *H01M 10/0422* (2013.01); *H01M 10/0468* (2013.01); *H01M 2/0257* (2013.01)

(56) References Cited

U.S. PATENT DOCUMENTS

| | | |
|---|---|---|
| 6,866,961 B2 | 3/2005 | Enomoto et al. |
| 6,875,540 B2 | 4/2005 | Nemoto et al. |
| 6,884,541 B2 | 4/2005 | Enomoto et al. |
| 8,097,358 B2 | 1/2012 | Lee |
| 9,023,500 B2 | 5/2015 | Kim et al. |
| 2001/0049054 A1 | 12/2001 | Enomoto et al. |
| 2008/0131768 A1* | 6/2008 | Lee ....................... H01M 2/023 429/174 |
| 2008/0248383 A1 | 10/2008 | Kim |
| 2012/0100404 A1 | 4/2012 | Lee et al. |
| 2013/0107363 A1 | 5/2013 | Yoneda et al. |
| 2015/0037637 A1 | 2/2015 | Mun |

OTHER PUBLICATIONS

U.S. Office Action dated Oct. 13, 2016, issued in cross-referenced U.S. Appl. No. 14/738,674 (9 pages).
U.S. Office Action dated May 15, 2017, issued in cross-reference U.S. Appl. No. 14/738,674 (11 pages).

* cited by examiner

RECHARGEABLE BATTERY

CROSS-REFERENCE TO RELATED APPLICATION

This application claims priority to and the benefit of Korean Patent Application No. 10-2014-0136201 filed in the Korean Intellectual Property Office on Oct. 8, 2014, the entire contents of which are incorporated herein by reference.

BACKGROUND

1. Field

The present invention relates to a rechargeable battery.

2. Description of the Related Art

Rechargeable batteries can be classified into small-size cylindrical and prismatic types, large-sized prismatic types, etc., depending on their sizes and capacities.

As technology develops and demand for mobile devices increases, the demand for small-sized cylindrical and prismatic rechargeable batteries as an energy source has increased.

In general, a rechargeable battery includes an electrode assembly with electrodes at opposite sides of a separator and wound in a jelly roll shape, a case for accommodating the electrode assembly, and a cap assembly for closing an opened side of the case.

With advancements in technology for mobile devices, peripheral devices such as touch pens and stylus pens, each with respective diameters of several millimeters, have been developed and used.

However, a rechargeable battery with an ultra-small diameter for use in such devices has not been previously developed.

In the rechargeable battery with an ultra-small diameter, the electrode assembly may move inside the case due to a work tolerance in coupling electrodes and terminals of the electrode assembly.

The above information disclosed in this Background section is only for enhancement of understanding of the background of the present invention and therefore it may contain information that does not form the prior art that is already known to a person of ordinary skill in the art.

SUMMARY

One or more embodiments of the present invention provide a pin type rechargeable battery having an ultra-small diameter.

One or more embodiments of the present invention provide a rechargeable battery that is capable of preventing (or minimizing) movement of an electrode assembly inside a case.

A rechargeable battery according to an exemplary embodiment of the present invention includes: an electrode assembly with a first electrode and a second electrode at opposite sides of a separator and wound about an axis; a first terminal coupled to the first electrode through a first tab and a second terminal coupled to the second electrode through a second tab; a case accommodating the electrode assembly and including a first opening and a second opening at opposite ends of the case; and a first gasket between the first terminal and the first opening and a second gasket between the second terminal and the second opening to seal the respective openings and allow the respective terminals to protrude outside of the case. The case may further include a fixing portion at its inner side that protrudes toward the electrode assembly.

The fixing portion may be depressed in a diametrical center of the case.

The fixing portion may be formed as a curved convex protrusion that is symmetrical in a length direction of the case and is directed toward the electrode assembly.

The first gasket may be between the first opening and the first terminal that seals the first opening and allows the first terminal to protrude outside of the case; and the second gasket may be between the second opening and the second terminal that seals the second opening and allows the second terminal to protrude outside of the case.

A length of the first tab may be longer than a first gap between the electrode assembly and the first terminal.

A length of the second tab may be longer than a second gap between the electrode assembly and the second terminal.

The case may include beading portions that are depressed toward a diametrical center at connecting portions where the first and second terminals and the first and second tabs are coupled in the first and second openings, respectively.

Uncoated regions of the first and second electrodes and the first and second tabs may be welded to each other.

The case may be formed of aluminum, stainless steel, or a synthetic resin material.

The case may have a diameter between about 2 mm and about 5 mm.

The first and second electrodes may be wound two to five times.

As described above, in an exemplary embodiment of the present invention, the first gasket is between the first terminal coupled to the first electrode of the electrode assembly through the first tab and the first opening of the case and the second gasket is between the second terminal coupled to the second electrode of the electrode assembly through the second tab and the second opening of the case to allow the first and second terminals to protrude outside of opposite ends of the case and to seal the first and second openings, respectively, thereby forming the pin type of rechargeable battery having an ultra-small diameter.

In addition, since the fixing portion at the inner side of the case holds the electrode assembly, movement of the electrode assembly inside the case can be prevented or minimized.

DETAILED DESCRIPTION

Figure 1:
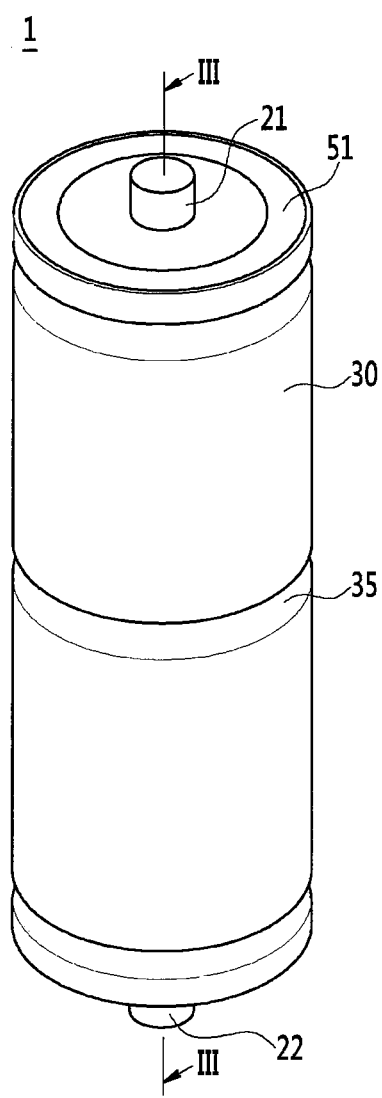
FIG. 1 is a perspective view of a rechargeable battery according to an embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

FIG. 1 is a perspective view of a rechargeable battery according to one or more embodiments of the present invention.

Referring to FIG. 1, the rechargeable battery 1 is a pin type battery with a diameter of several millimeters. For example, the diameter may be between about 2 mm and about 5 mm.

Figure 2:
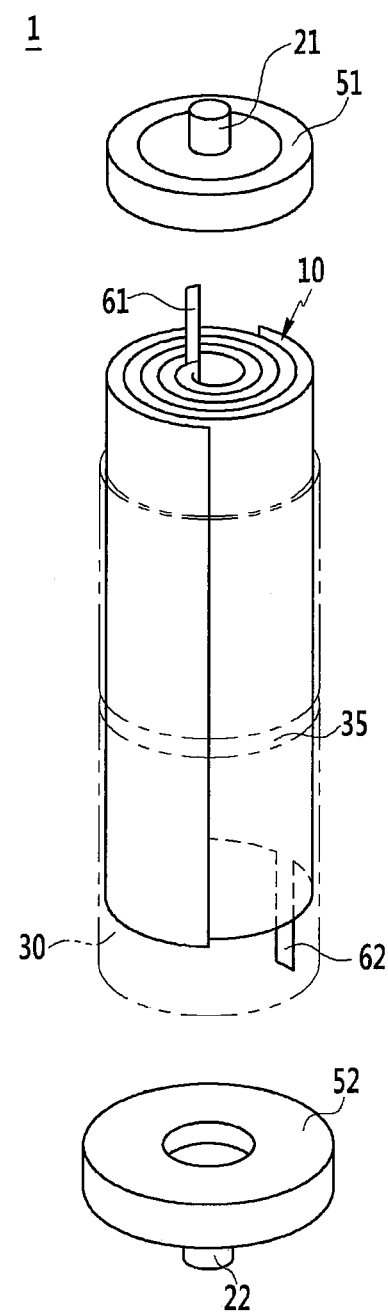
FIG. 2 is an exploded perspective view of FIG. 1.
Figure 3:
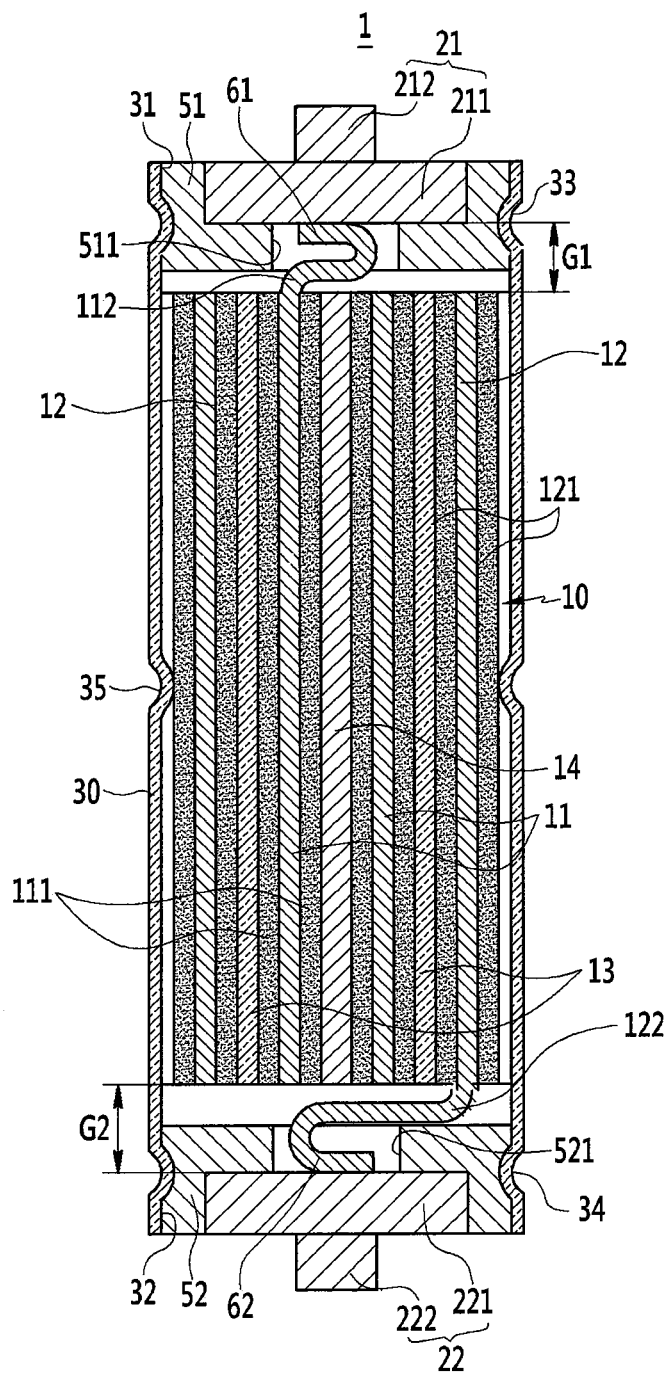
FIG. 3 is a cross-sectional view of FIG. 1 taken along the line III-III.

FIG. 2 is an exploded perspective view of FIG. 1, and FIG. 3 is a cross-sectional view of FIG. 1 taken along the line III-III.

Referring to FIGS. 2 and 3, the rechargeable battery 1 of the first exemplary embodiment includes an electrode assembly 10 for charging and discharging, first and second terminals 21 and 22 coupled to the electrode assembly 10, a case 30 for accommodating the electrode assembly 10 and an electrolyte solution, and first and second gaskets 51 and 52 interposed between the first and second terminals 21 and 22, respectively, and the case 30.

The electrolyte solution may be inserted into the case 30 to interact with the electrode assembly 10.

The electrode assembly 10 includes a first electrode 11 and a second electrode 12 at opposite sides of a separator 13. The separator 13 is an insulator.

The electrode assembly 10 is formed by winding the first electrode 11, the second electrode 12, and the separator 13 in a jelly roll configuration.

For example, the first and second electrodes 11 and 12 and the separator 13 may be wound between two to five times around a core 14.

The diameter of the rechargeable battery 1 and the thickness of the separator 13 and the first and second electrodes 11 and 12 may limit the number of windings of the electrode assembly 10 to between two and five.

For example, when the first and second electrodes 11 and 12 are wound fewer than two times, the rechargeable battery 1 may not provide a required capacity, and the diameter of the rechargeable battery 1 may exceed 5 mm when the first and second electrodes 11 and 12 are wound more than five times.

The first and second electrodes 11 and 12 include coated regions 111 and 121 where an active material is coated on opposite surfaces of a current collector formed of a thin metal foil (for example, copper and aluminum foils), and uncoated regions 112 and 122 where the active material is not coated thereon to expose the current collector.

Figure 4:
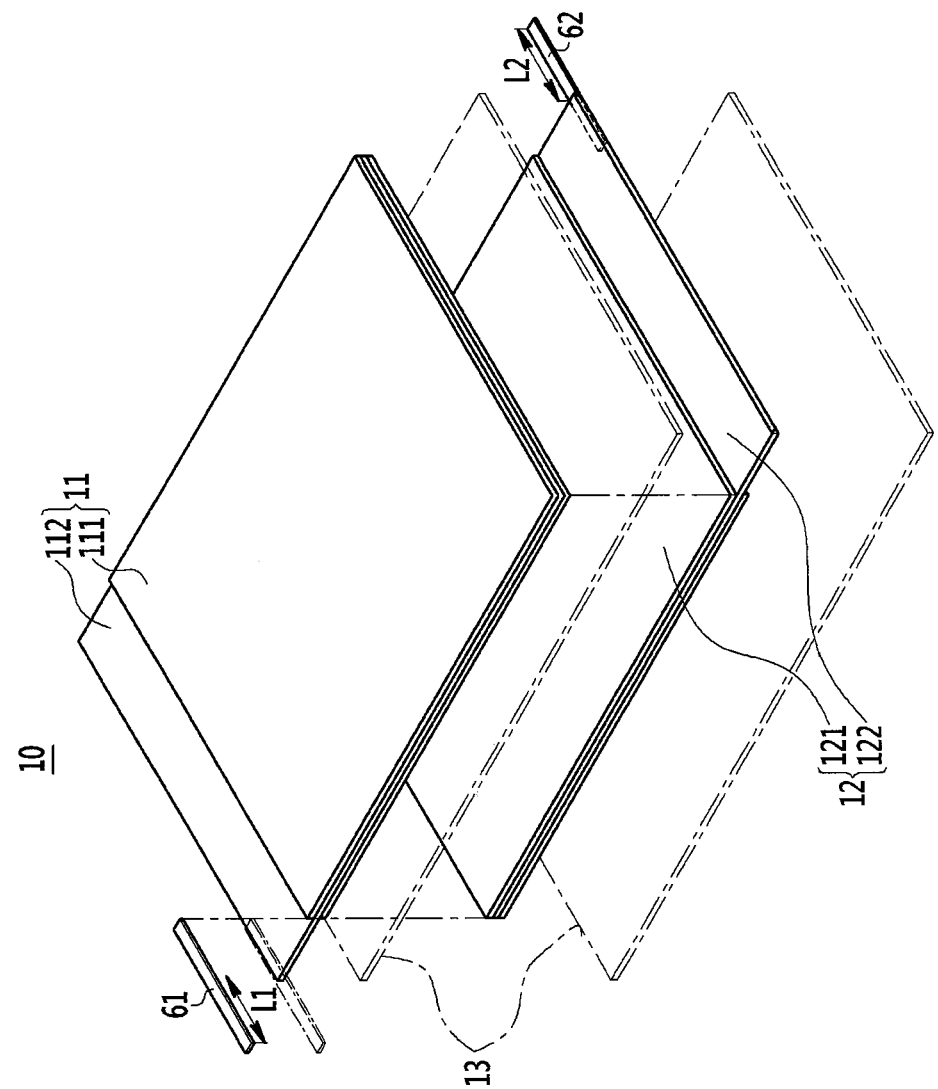
FIG. 4 is an exploded perspective view of an electrode assembly of FIG. 2.

FIG. 4 is an exploded perspective view of the electrode assembly of FIG. 2.

Referring to FIGS. 2 to 4, the first terminal 21 is coupled to the first electrode 11 and the second terminal 22 is coupled to the second electrode 12.

The first terminal 21 is coupled to the uncoated region 112 of the first electrode 11 through a first tab 61.

The second terminal 22 is coupled to the uncoated region 122 of the second electrode 12 through a second tab 62.

The case 30 is provided with a first opening 31 and a second opening 32 at its opposite ends to accommodate the electrode assembly 10.

For example, the case 30 is cylindrically formed to accommodate the cylindrically-formed electrode assembly 10.

The rechargeable battery 1 is a pin type battery having an ultra-small diameter wherein its outer diameter is set by the case 30.

The first terminal 21 is coupled to the first electrode 11 of the electrode assembly 10 by the first tab 61 through the first opening 31. Similarly, the second terminal 22 is coupled to the second electrode 12 of the electrode assembly 10 by the second tab 62 through the second opening 32.

For example, the first tab 61 is welded to the uncoated region 112 of the first electrode 11 and the second tab 62 is welded to the uncoated region 122 of the second electrode 12.

In some embodiments, the first and second tabs 61 and 62 may be integrally formed with the uncoated regions of the first and second electrodes 11 and 12.

In these embodiments, a process for welding the first and second tabs with the uncoated regions of the first and second electrodes, respectively, may be omitted.

The first terminal 21 may include a plate portion 211 that seals the first opening 31 and a protruding portion 212 that protrudes from the plate portion 211. Similarly, the second terminal 22 may include a plate portion 221 that seals the second opening 32 and a protruding portion 222 that protrudes from the plate portion 221.

The plate portions 211 and 221 allow the first and second terminals 21 and 22, respectively, to be easily coupled to the first and second tabs 61 and 62, respectively, and the protruding portions 212 and 222 allow the first and second terminals 21 and 22, respectively, to be easily coupled to a device that uses the rechargeable battery 1.

The first gasket 51 is interposed between the first terminal 21 and the first opening 31 of the case 30. The first gasket 51 and the first terminal 21 seal the first opening 31 and the first gasket 51 electrically insulates the first terminal 21 from the first opening 31 of the case 30, and allows the protruding portion 212 of the first terminal 21 to protrude out of the case 30.

The second gasket 52 is interposed between the second terminal 22 and the second opening 32 of the case 30. The second gasket 52 and the second terminal 22 seal the second opening and the second gasket 52 electrically insulates the second terminal 22 from the second opening 32 of the case 30, and allows the protruding portion 222 of the second terminal 22 to protrude out of the case 30.

A length L1 of the first tab 61 (i.e., the length of the first tab 61 protruding from the uncoated region 112) is longer than a first gap G1 between one end of the electrode assembly 10 and the first terminal 21.

Accordingly, the first tab 61 may electrically couple the uncoated region 112 of the first electrode 11 and the first terminal 21.

For this purpose, the first gasket 51 includes a first tab hole 511.

The first tab 61 is curved according to the first tab hole 511.

A length L2 of the second tab 62 (i.e., the length of the second tab 62 protruding from the uncoated region 122) is longer than a second gap G2 between the other end of the electrode assembly 10 and the second terminal 22.

Accordingly, the second tab 62 may electrically couple the uncoated region 122 of the second electrode 12 and the second terminal 22.

For this purpose, the second gasket 52 includes a second tab hole 521.

The second tab 62 is curved according to the second tab hole 521.

For example, the first gasket 51 is combined to the first terminal 21 that is coupled to the first electrode 11 of the electrode assembly 10 through the first tab 61 and the second gasket 52 is combined to the second terminal 22 that is coupled to the second electrode 12 of the electrode assembly 10 through the second tab 62.

The first and second gaskets 51 and 52 are respectively fitted into the first and second openings 31 and 32 of the case 30 and are respectively fixed to the first and second openings 31 and 32 of the case 30 by a crimping process.

First and second beading portions 33 and 34 are each formed in the case 30 and are respectively depressed toward diametrical centers of the first and second openings 31 and 32.

The first and second gaskets 51 and 52 are respectively fixed by the first and second beading portions 33 and 34 and allow the first and second terminals 21 and 22, respectively, to protrude out of the case 30 and respectively seal the first and second openings 31 and 32.

Accordingly, the first and second beading portions 33 and 34 are respectively provided in the first and second openings 31 and 32 of the case 30 to correspond to respective connecting portions between the first and second terminals 21 and 22 and the first and second tabs 61 and 62.

The case 30 may be formed of a metal, for example, aluminum or stainless steel, that forms the first and second beading portions 33 and 34.

The first beading portion 33 is depressed toward the diametrical center near the interface of the first terminal 21 and the first tab hole 511, and the second beading portion 34 is depressed toward the diametrical center near the interface of the second terminal 22 and the second tab hole 521.

Accordingly, while the first and second beading portions 33 and 34 of the case 30 compress the first and second gaskets 51 and 52, respectively, fastening forces of the first and second terminals 21 and 22 and the first and second beading portions 33 and 34 can be further increased.

In one or more embodiments, the first and second gaskets 51 and 52 may each be a rubber cap.

As described above, the first and second tabs 61 and 62 are respectively coupled to the first and second terminals 21 and 22 by coupling the first and second tabs 61 and 62 to the first and second electrodes 11 and 12 of the electrode assembly 10, respectively, and then inserting one side of the electrode assembly 10 into the case 30. The first and second gaskets 51 and 52 are combined to the first and second terminals 21 and 22, respectively, and the first and second gaskets 51 and 52 are respectively combined to the first and second openings 31 and 32, and the first and second beading portions 33 and 34 are each depressed, thereby assembling the rechargeable battery 1.

For example, while the first and second openings 31 and 32 of the case 30 are opened, the first and second tabs 61 and 62 are coupled to the first and second terminals 21 and 22, respectively, thereby allowing the first and second terminals 21 and 22 to be easily coupled to the first and second tabs 61 and 62.

Subsequently, the first and second gaskets 51 and 52 combined to the first and second terminals 21 and 22, respectively, are inserted into the first and second openings 31 and 32 of the case 30 to form the first and second beading portions 33 and 34, thereby making the assembly of the rechargeable battery 1 easier.

Referring back to FIGS. 1 to 3, the case 30 is further provided with a fixing portion 35 that protrudes toward the electrode assembly 10 from an inner side of the case 30.

The fixing portion 35 is depressed toward a diametrical center of the case 30 from a longitudinal center portion thereof.

Because the fixing portion 35 is depressed after the electrode assembly 10 is inserted into the case 30, the fixing portion 35 contacts an outermost side of the electrode assembly 10.

Accordingly, the electrode assembly 10 does not move (or movement of the electrode assembly 10 is limited or minimized) in a length direction inside the case 30.

For example, in the rechargeable battery 1 the length L1 of the first tab 61 is longer than the first gap G1, and the length L2 of the second tab 62 is longer than the second gap G2 to allow the first and second terminals 21 and 22 to be easily coupled to the first and second tabs 61 and 62, respectively.

Thus, the electrode assembly 10 may remain fixed, or substantially fixed, inside the case 30.

In the first exemplary embodiment, the fixing portion 35 continues (e.g., continues without interruption or breaks) along a circumference (e.g., along an entire circumference) of the longitudinal center portion of the case 30.

In one or more embodiments, there may be a plurality of fixing portions that are spaced apart from each other in the length direction.

In one or more embodiments, the fixing portion may have a predetermined length in the length direction of the case, or there may be one fixing portion or a plurality of fixing portions that are spaced apart from the circumferential at the center portion.

Another exemplary embodiment of the present disclosure follows.

Figure 5:
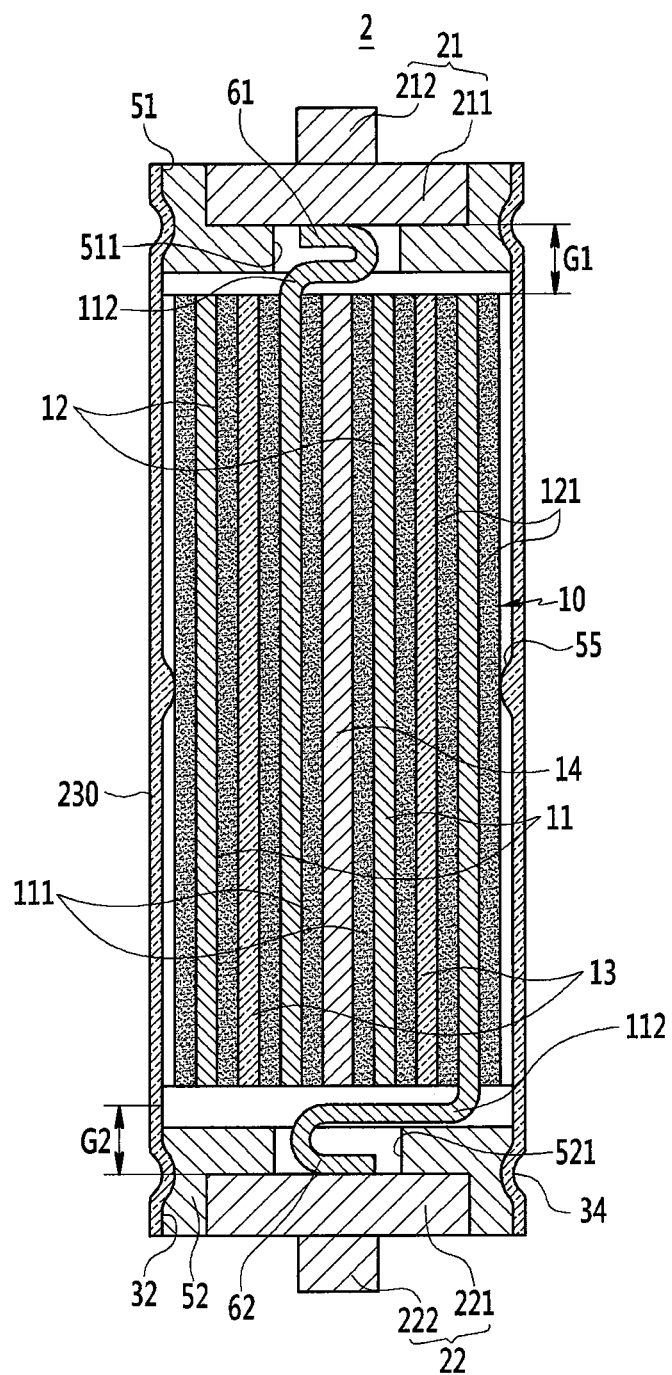
FIG. 5 is a cross-sectional view of a rechargeable battery according to another embodiment of the present invention.

FIG. 5 is a cross-sectional view of a rechargeable battery according to one or more embodiments of the present invention.

Referring to FIG. 5, the rechargeable battery 2 includes a fixing portion 55 is formed as a curved convex protrusion directed toward the electrode assembly 10.

The curved convex protrusion may allow the electrode assembly 10 to be compressively inserted into a case 230.

For example, the case 230 may be formed of a synthetic resin material.

In one or more embodiments, when the electrode assembly 10 is inserted into the case 230, the case 230 is deformed in a diametrical direction to allow insertion of the electrode assembly 10.

When the case is formed of a synthetic resin material, the fixing portion may be ultraviolet cured and then heat-shrunk after it is expanded to allow for insertion of the electrode assembly.

As such, the electrode assembly may be easily inserted into the case.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SOME OF THE SYMBOLS 1, 2: rechargeable battery
10: electrode assembly
11, 12: first, second electrode
13: separator
14: core
21, 22: first, second terminal
30, 230: case
31, 32: first, second opening 33, 34: first, second beading portion
35, 55: fixing portion
51, 52: first, second gasket
61, 62: first, second tab
111, 121: coated region
112, 122: uncoated region
211, 221: plate portion
212, 222: protruding portion
511, 521: first, second tab hole
G1, G2: first, second gap
L1, L2: length

What is claimed is:

1. A rechargeable battery comprising:
an electrode assembly comprising first and second electrodes at opposite sides of a separator and wound about an axis;
a first terminal coupled to the first electrode through a first tab;
a second terminal coupled to the second electrode through a second tab;
a case accommodating the electrode assembly and having first and second openings at opposite ends of the case;
a first gasket between the first terminal and the case at the first opening, the first gasket sealing the first opening and allowing the first terminal to protrude outside of the case; and
a second gasket between the second terminal and the case at the second opening, the second gasket sealing the second opening and allowing the second terminal to protrude outside of the case,
wherein the case further comprises a fixing portion at its inner side that protrudes toward the electrode assembly, and
wherein the fixing portion directly contacts an outermost side of the electrode assembly.

2. The rechargeable battery of claim 1, wherein the fixing portion is depressed in a direction toward a diametrical center of the case.

3. The rechargeable battery of claim 2, wherein the fixing portion comprises a curved convex protrusion that is symmetrical in a length direction of the case and protrudes toward the electrode assembly.

4. The rechargeable battery of claim 1, wherein a length of the first tab is longer than a first gap between the electrode assembly and the first terminal.

5. The rechargeable battery of claim 1, wherein a length of the second tab is longer than a second gap between the electrode assembly and the second terminal.

6. The rechargeable battery of claim 1, wherein the case comprises a first beading portion and a second beading portion, and wherein the first beading portion is depressed toward a diametrical center of the first opening at a connecting portion of the first terminal and the first tab and the second beading portion is depressed toward a diametrical center of the second opening at a connecting portion of the second terminal and the second tab.

7. The rechargeable battery of claim 1, wherein an uncoated region of the first electrode is welded to the first tab and an uncoated region of the second electrode is welded to the second tab.

8. The rechargeable battery of claim 1, wherein the case comprises aluminum, stainless steel, or a synthetic resin material.

9. The rechargeable battery of claim 1, wherein the case has a diameter between about 2 mm and about 5 mm.

10. The rechargeable battery of claim 1, wherein the first and second electrodes are wound two to five times.

11. The rechargeable battery of claim 1, wherein the fixing portion is located between the first tab and the second tab along a length direction of the case.

12. The rechargeable battery of claim 6, wherein the first beading portion directly contacts the first gasket and the second beading portion directly contacts the second gasket.

* * * * *